United States Patent
Nguyen et al.

(10) Patent No.: US 9,983,410 B2
(45) Date of Patent: May 29, 2018

(54) DEVICE AND METHOD FOR AUTHENTICATION OF A DOCUMENT

(71) Applicant: MORPHO, Issy les Moulineaux (FR)

(72) Inventors: Eric Nguyen, Issy les Moulineaux (FR); Francois Rieul, Issy les Moulineaux (FR); Lauriane Couturier, Issy les Moulineaux (FR); Marie Jarlegan, Issy les Moulineaux (FR); Pierre Chastel, Issy les Moulineaux (FR); Vincent Bouatou, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 300 days.

(21) Appl. No.: 14/805,369

(22) Filed: Jul. 21, 2015

(65) Prior Publication Data
US 2016/0018656 A1    Jan. 21, 2016

(30) Foreign Application Priority Data
Jul. 21, 2014 (FR) .................................. 14 56998

(51) Int. Cl.
G02B 27/01 (2006.01)
G06K 9/00 (2006.01)
(Continued)

(52) U.S. Cl.
CPC ......... *G02B 27/0172* (2013.01); *B42D 25/00* (2014.10); *G02B 27/017* (2013.01);
(Continued)

(58) Field of Classification Search
None
See application file for complete search history.

(56) References Cited

U.S. PATENT DOCUMENTS 6,172,657 B1    1/2001 Kamakura et al.
2012/0200601 A1    8/2012 Osterhout et al.
(Continued)

FOREIGN PATENT DOCUMENTS

WO    WO-2014198945    12/2014

OTHER PUBLICATIONS

Search Report in French Application No. 1456998, dated Mar. 10, 2015. 7 pages.

*Primary Examiner* — Amare Mengistu
*Assistant Examiner* — Sarvesh J Nadkarni
(74) *Attorney, Agent, or Firm* — Womble Bond Dickinson (US) LLP

(57) ABSTRACT

The invention relates to a method and a device (1) for authenticating information contained in a document (6), said device including
at least one imager configured for acquiring at least one image of an acquisition field,
at least one light source,
computer processing means configured for processing the image and for extracting therefrom data relating to the document,
said device being adapted so as to be mounted on the head of a user (10) so that its acquisition field (11) covers at least one portion of the field of vision (12) of the user (10), the light source being configured so as to emit in the acquisition field (11) of the imager, a light of at least one non-visible wavelength, the imager being adapted for allowing acquisitions at said wavelength and thus allowing acquisition at this wavelength of an image of a document (6) presented to the user (10) in the acquisition field of the imager. The invention also relates to the corresponding method.

20 Claims, 4 Drawing Sheets

Figure 1:
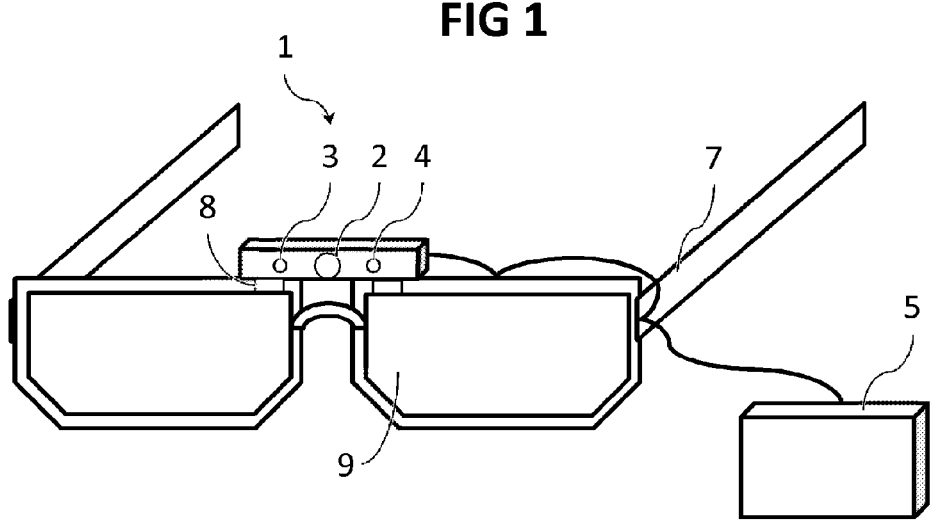

(51) Int. Cl.
  *G06K 7/10* (2006.01)
  *G06F 3/01* (2006.01)
  *G06F 3/03* (2006.01)
  *G06F 21/34* (2013.01)
  *B42D 25/00* (2014.01)

(52) U.S. Cl.
  CPC ............ *G06F 3/012* (2013.01); *G06F 3/0317* (2013.01); *G06F 21/34* (2013.01); *G06K 7/10821* (2013.01); *G06K 9/00442* (2013.01); *G02B 2027/014* (2013.01); *G02B 2027/0138* (2013.01); *G02B 2027/0178* (2013.01)

(56) References Cited

U.S. PATENT DOCUMENTS

2013/0069985 A1\* 3/2013 Wong .................. G02B 27/017
  345/633
2014/0125558 A1 5/2014 Miyajima et al.
2014/0369570 A1\* 12/2014 Cheikh .............. G07C 9/00031
  382/116

\* cited by examiner

FIG 5
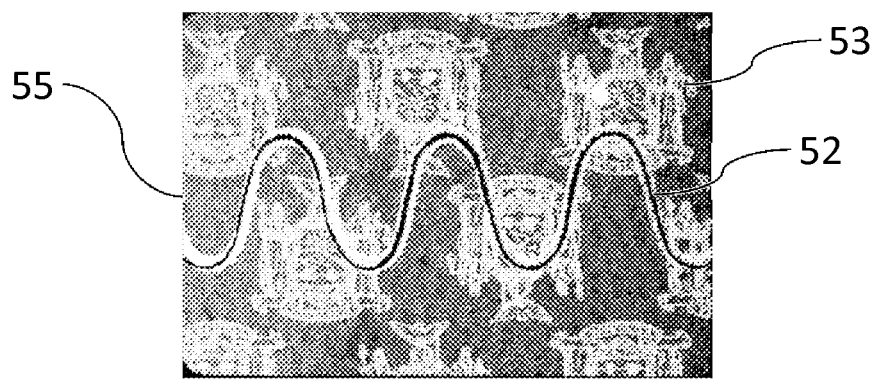

DEVICE AND METHOD FOR AUTHENTICATION OF A DOCUMENT

TECHNICAL FIELD OF THE INVENTION

The present invention relates to the acquisition and authentication of a secured document, such as an identity document, a passport or a driving licence.

Many situations require obtaining a proof of identity and the necessity of ensuring the authenticity of the latter. This is notably the case not only for official bodies such as the police or customs, but also for generating a contract between a private person and a service provider such as a bank institution, automobile vehicle rental, a hotel, or a telecommunications operator.

Indeed, such interactions require the filling, in an electronic file, of data contained in documents such as identity cards, driving licences, or passports. Typically, an operator has to read these data on the documents and enter them into a computer.

In order to allow automatic reading of documents, many documents have at least one machine readable zone provided with data having a predetermined and standardized configuration, known to the electronic reader, and allowing the latter to extract said predetermined and standardized data. Such a configuration is found in documents as diverse as movie tickets, tickets for accessing a sporting event or a concert, but also on train, airplane tickets or bank notes.

As an illustration, in order to dispense the operator from a tedious task, certain present secured documents have machine readable zones. These machine readable zones are very widespread and are found not only in official identity documents, such as passports and driver licences, but also in documents such as loyalty cards, membership cards or certificates of any kind. An machine readable zone has alphanumerical characters positioned according to a predetermined and standardized configuration, known to the electronic reader and allowing the latter to extract the data present in this sequence of alphanumerical characters.

For example, recent passports have such zones in which the machine readable zone consists of two rows each with 44 characters. For the first row, the first character is a letter indicating the type of document, in this case P for a passport. The second character indicates the type of passport. The third, fourth and fifth characters encode the country or the issuing authority. The following 39 characters indicate the names and forenames of the owner of the passport. The second line begins with nine characters forming the number of the passport, the tenth character forming a verification figure. Characters 11 to 13 are letters indicating the nationality of the owner. Characters 14 to 19 are figures indicating the date of birth of the owner.

Thus, a reader reading the machine readable zone is able to extract the information which is contained, and which gives the possibility of obtaining the essential data characterizing the documents such as the data relating to the identity of the owner of an identity document, and this without any human intervention.

However, simply reading an machine readable zone or optical recognition of characters cannot be used for authenticating a document. The secured document may contain security elements to be automatically read, which may be read and checked by specific automatic reading devices (document readers). This type of element is used for authenticating a travel or identity document by detecting or measuring particular physical properties which the elements or structures of the document have and also allows authentication of the owner of the document.

Further, systems have been provided with chip readers for reading electronic chips contained in these documents, as well as with means for checking security elements of the document by means of an illumination outside the visible spectrum (infrared, ultraviolet). To this day, such systems are cumbersome since they generally appear as a terminal to which the operator has to submit the document, in addition to visual inspection of the document which the operator has to perform. Thus, these systems prove to be not very practical since they require additional handling of the document by the operator in order to bring said document into a zone for reading the electronic chip.

In fact, such verification in two phases, one by the human operator and the other one by the verification system, causes a loss of precious time, notably at places where the flow of documents to be verified is significant, such as airports. Further, the proposed systems are cumbersome and complex.

PRESENTATION OF THE INVENTION

The object of the invention is to partly find a remedy to at least these drawbacks and preferentially to all of them, by proposing a combination of visual inspection performed by the operator with the extraction of information and authentication of the document by a machine.

A method for authenticating a document, is thereby proposed, performed with a device for authentication of information contained in a document, said device including
  at least one imager configured for acquiring at least one image of an acquisition field,
  at least one light source,
the device being adapted so as to be mounted on the head of a user so that its acquisition field covers at least one portion of the field of vision of the user, the light source being configured so as to emit in the acquisition field of the imager a light of at least one non-visible wavelength, the imager being adapted for allowing acquisitions at said wavelength and thus allow acquisition at this wavelength of an image of a document presented to the user in the acquisition field of the imager, the method comprising the steps according to which:
  the light source emits light in a non-visible spectrum into the acquisition field towards a document presented to the user,
  the imager acquires at least one image of the document illuminated by the light source and sends the image to a processing computer configured for processing the image and for extracting data relating to the document having a predetermined configuration in the document,
  the processing computer performs on the image a detection of a security element in at least one wavelength out of the visible spectrum,
  the document is authenticated or not on the basis of the detection or not of the security element.

This method is advantageously completed with the following features, taken alone or in any of their technically possible combinations:
  the method comprises:
  a preliminary acquisition by the imager of an image of the document in the acquisition field, and
  a detection of an machine readable zone of the document and the extraction of the information contained in said machine readable zone;

the step for detecting a security pattern comprises the following sub-steps, from information contained in the machine readable zone:

extracting a zone of the image which may contain a security element, identifying in a database a reference element corresponding to said security element and comparing the zone of the image with the reference element;

the method comprises steps according to which:

data are recovered in a database depending on information contained in the machine readable zone, and these data are displayed in the field of vision of the user by head-up display means;

light emission in a non-visible wavelength by the light source is conditioned by the reading of the machine readable zone;

light emission in a non-visible wavelength by the light source is conditioned by a command from the user.

An assembly for authentication of information contained in a document is also proposed, said assembly including a device for authentication of information contained in a document, said device comprising at least one imager configured for acquiring at least one image of an acquisition field, at least one light source, wherein said device is adapted so as to be mounted on the head of a user so that its acquisition field covers at least one portion of the field of vision of the user, the light source being configured so as to emit in the acquisition field of the imager a light of at least one non-visible wavelength, the imager being adapted for allowing acquisitions at said wavelength and thus allow acquisition at this wavelength of an image of a document presented to the user in the acquisition field of the imager, and wherein said assembly comprise a processing computer configured for processing the image and for extracting data relating to the document having a predetermined configuration in the document, and for detecting in the acquired image at said non-visible wavelength a security element, the document being authenticated or not on the basis of the detection or not of the security element.

The assembly is advantageously completed with the following features, taken alone or in any of their technically possible combinations:

the data having a predetermined configuration appear in alphanumerical form in the document;

the light source is configured for emitting in the infrared or ultraviolet domain;

the device comprises at least:

one first light source configured for emitting ultraviolet light in the acquisition field of the imager;

one second light source configured for emitting infrared light in the acquisition field of the imager;

the device comprises a suitable mounting for maintaining the device on the head of the user by cooperation with said head;

the device comprises mounting means for mounting the device on a spectacle frame;

the device further comprises head-up display means intended to be positioned in the field of vision of the user;

the device comprises an accelerometer and/or a gyroscope, the measurements of which are taken into account for controlling the imager and/or the light source;

the device further comprises an electronic chip reader support adapted so as to be mounted on the hand of a user.

The invention also relates to a computer program product comprising program code instructions recorded on a medium which may be used in a computer for executing steps of the method according to the invention when said program is executed on a computer.

PRESENTATION OF THE FIGURES

Figure 2:
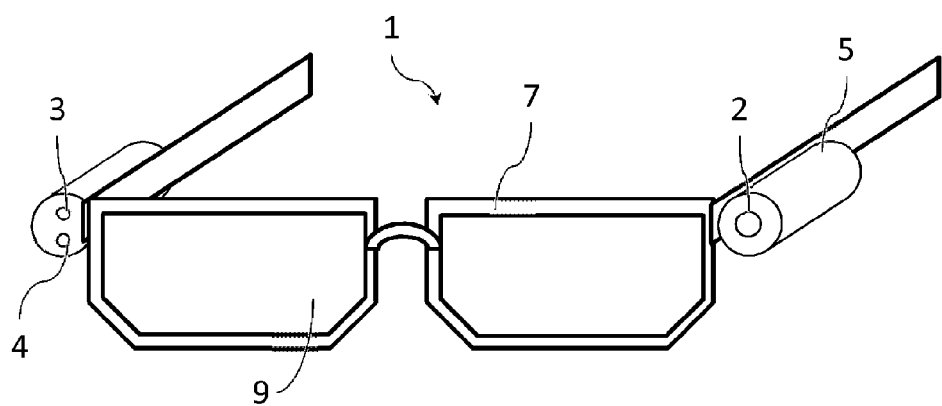
Figure 3:
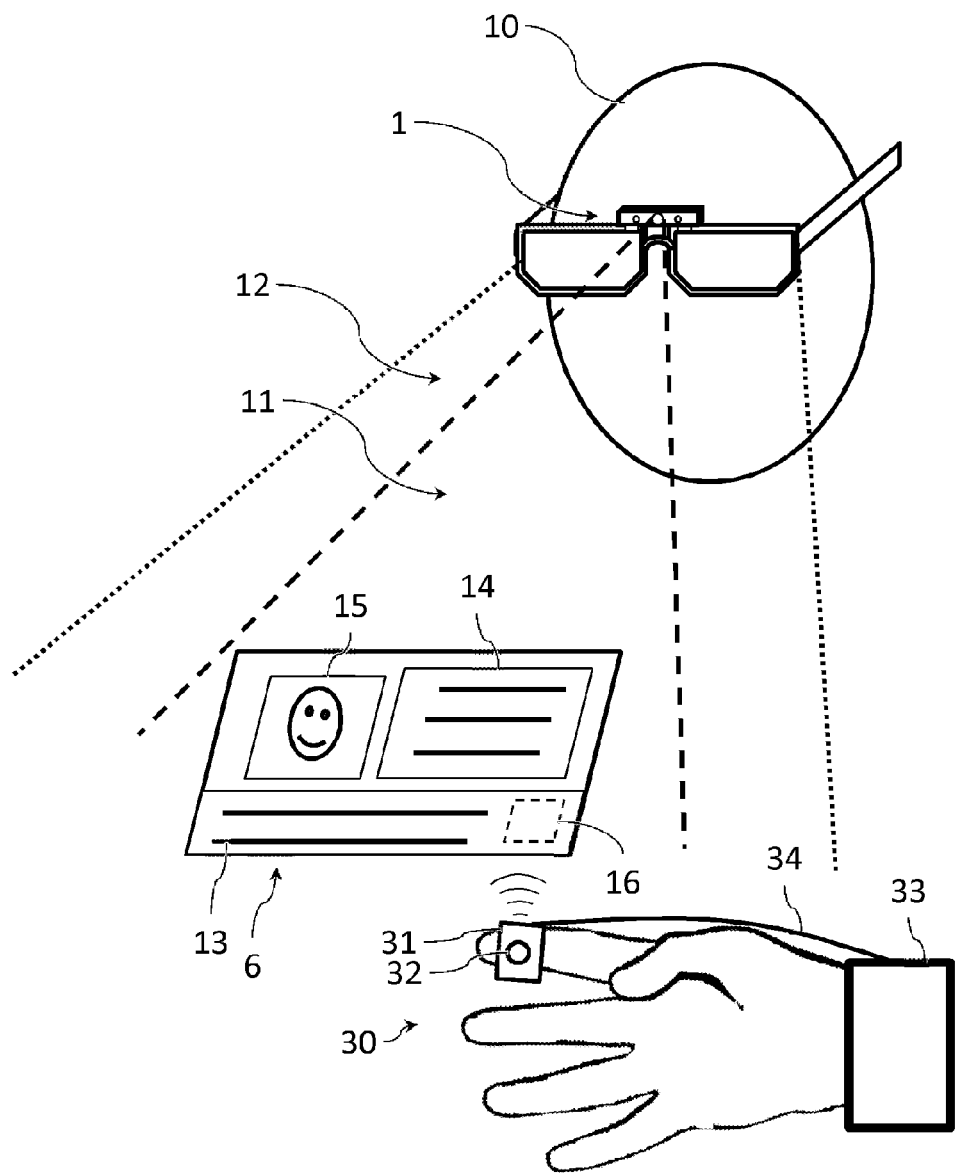
Figure 4:
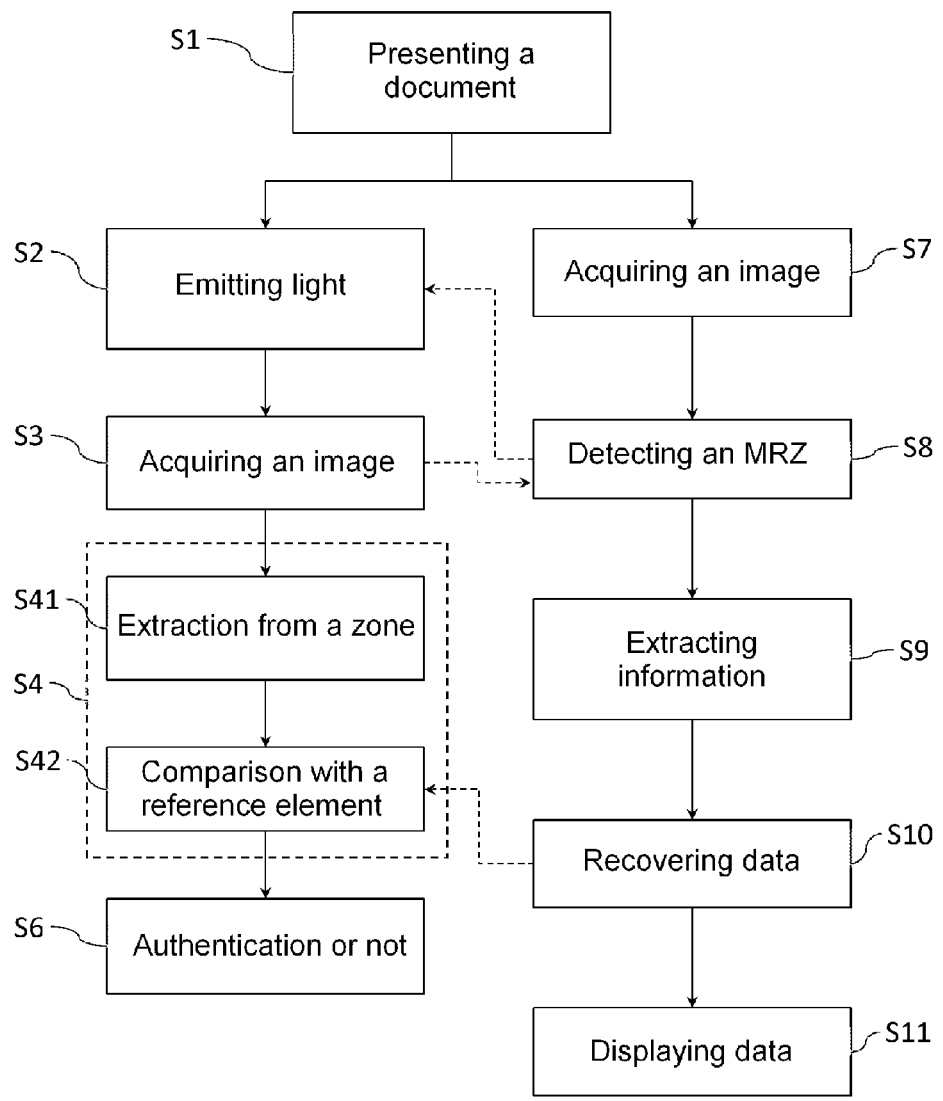

The invention will be better understood, by means of the description hereafter, which relates to embodiments and alternatives according to the present invention, given as non-limiting examples and explained with reference to the appended schematic drawings, wherein:

FIGS. 1 and 2 are schematic views of a device according to possible embodiments of the invention, FIG. 3 is a schematic view illustrating the use of the device according to a possible embodiment of the invention, FIG. 4 is a block diagram illustrating steps of the method according to a possible embodiment of the invention, FIG. 5 illustrates an example of differences in viewing a document according to different light wavelengths.

DETAILED DESCRIPTION

With reference to FIGS. 1 to 3, the device 1 for acquiring and authenticating information contained in a document comprises at least one imager 2 configured for acquiring at least one image of the acquisition field 11. The device is adapted so as to be mounted on the head of a user so that the acquisition field of the imager 2 covers at least one portion of the field of vision 12 of the user 10.

In this respect, as illustrated in the appended figures, the device may comprise a frame 7 adapted for maintaining the device on the head of the user 10 by cooperating with said head, or else comprise mounting means 8 for mounting the device 1 on a spectacle frame 7 intended to be placed on the head of the user 10, these mounting means 8 may for example assume the form of an elastic connection system.

Thus, in the example illustrated by FIG. 1, the device has elastic mechanical mounting means 8 attached on a spectacle frame 7. The device 1 is here represented as positioned between both circles maintaining the lenses at the upper bar of the latter, above the bridge connecting them. Of course, this is an example of other frame types which may be used, such as eyeglasses or binoculars, and the lenses may be absent.

An assembly for authentication of information contained in a document comprises the device 1 for authentication of information contained in a document, and a processing computer 5, which can be part of the device 1 or distinct from the device 1. Preferably, the pair of spectacles 7 on which the device is mounted, comprises a processing computer 5 and/or head-up display means 9 intended to be positioned in the field of vision of the user, of the type "smart glasses" and the device 1 is configured so as to be able to communicate with the a processing computer of these smart glasses, which may consequently be moved away from the device 1 as illustrated in FIG. 1. In this case, the a processing computer 5 of the device 1 may be the computer of the smart glasses, which is then a shared processing computer, since said processing computer is not dedicated to the device 1.

In another alternative, the device may comprise a frame 7 adapted for maintaining the device on the head of the user by cooperating with said head, as this is the case when the device 1 assumes the shape of a pair of spectacles, such as for example as illustrated by FIG. 2. In this case, the processing computer 5 of the device 1 may be a processing computer dedicated to the device 1, which may be incorporated into a casing containing other elements such as the imager 2, or else be moved away, similarly to the processing computer 5 illustrated by FIG. 1. Also, the device 1 may comprise head-up display means 9 intended to be positioned in the field of vision of the user. The head-up display means 9 may comprise a transparent lens allowing the user 10 to have a direct view of his/her environment, and a transparent mirror positioned between the lens and the user on which images collimated at infinity are projected. The device 1 may then assume the form of smart glasses as mentioned above.

As illustrated in FIG. 3, the acquisition field 11 of the imager 2 appears so that any document 6 positioned in the field of vision 12 of the user 10 in order to be read by the user 10 is found in the acquisition field 11 of the imager 2. Preferably, the device 1 is configured so that the acquisition field 11 of the imager 1 covers at least the central portion of the field of vision 12 of the user 10. Ideally, the acquisition field 11 fits as closely as possible to the field of vision 12 of the user.

Document 6 is a secured document for which authentication is requested. In the example shown, it includes a photograph 15 of the owner of the document 6, a visual inspection zone 14 including the designation of the document, the private data of the owner of the document and the data relating to the issuance and validity of the document 6. The document 6 may also comprise an machine readable zone 13.

The device 1 comprises at least one light source 3, 4. The latter is configured for emitting in the acquisition field 11 of the imager 1, a light of at least one non-visible wavelength, i.e. outside the visible spectrum. The visible spectrum is generally defined by wavelengths comprised between 400 nm and 780 nm. Thus, a light of at least one non-visible wavelength is a light for which the power spectrum density is maximum for a wavelength of less than 400 nm or greater than 780 nm. In fact, this non-visible wavelength belongs to the infrared or ultraviolet domain. Thus, the light source 3, 4 is configured for emitting in the infrared or ultraviolet domain. Preferably, at least one light source 3, 4 emits in the ultraviolet.

The term of ultraviolet (UV) designates electromagnetic waves for which the wavelengths are located just below the spectrum of visible light (200-400 nm). This is a light source used for examining documents with the purpose of analyzing the luminosity of the supports, the fluorescent inks and other security elements, as well as manipulation attempts.

Suspect or discolored documents may be examined under exposure to ultraviolet radiation in order to obtain more sharpness and better resolution. Many inks change aspect when they react to electromagnetic waves of the light (fluorescent ink). Fluorescent security fibers may react in a bright way. Further, when such fibers are altered by the attempt of erasement by a forger, this may be seen under exposure to UVs.

The light source 3, 4 emitting in the ultraviolet may for example emit light in the wavelengths of 365/366 nm (UV of long wavelength), of 313 nm (UV of medium wavelength) and of 254 nm (UV of short wavelength).

Preferably, as in the illustrated examples, the device comprises two light sources 3, 4, which are each configured for emitting light of at least one non-visible wavelength different from the other. One may emit light in the infrared, for example at a wavelength of 870 nm, and the other may emit in the ultraviolet, for example at a wavelength of 365 nm. For example, these light sources 3, 4 are light-emitting diodes.

Consequently, the device 1 may comprise
a first light source 3 configured for emitting ultraviolet light in the acquisition field 11 of the imager 1, and
a second light source 4 configured for emitting infrared light in the acquisition field 11 of the imager 1.

The light source(s) 3, 4 may be positioned in proximity to the imager 2, as this is the case in FIG. 1, or else be at a distance from it, as this is the case in FIG. 2, wherein the imager 2 is positioned on a branch of the frame 7 while the light sources 3, 4 are positioned on the other branch of the frame 7.

In all the cases, the light source(s) 3, 4 is(are) oriented similarly to the imager 2, i.e. in the direction of the field of vision 12 of the user 10 when the device 1 is mounted on the head of the user 10, in order to emit light in the direction opposite to the head of the user 10, notably towards a document 6 presented to the user 10 in the acquisition field 11 of the imager 2.

The imager 2 is adapted so as to allow acquisition of an image at a wavelength emitted by the light source 3, 4 and thus allow acquisition at this wavelength of an image of a document 6 presented to the user in the acquisition field 11 of the imager 2.

The imager 2 may for example acquire an image in a wavelength spectrum covering the infrared, visible and ultraviolet light, thus covering the emission wavelengths of the light source(s) 3, 4. The imager 2 may also acquire an image in the ultraviolet emitted by a first light source 3, and another one in the infrared emitted by the second light source 4.

The illumination by the light source 3, 4 may be controlled via the processing computer 5 dedicated to the device 1 or the shared processing computer by the device 1, or else by the action of the user on a member for controlling the device such as a push button.

Optionally, the device may comprise an accelerometer and/or a gyroscope, the measurements of which are taken into account for controlling the imager 2 and/or the light source 3, 4.

With reference to FIG. 4, a method for authentication of a document 6 applied by a device 1 as described earlier will now be described. The device 1 is configured for applying the method according to the invention.

A document 6 is presented in the field of vision of the user 10 (step S1), in a zone of the latter covered by the acquisition field of the imager 2. At least one light source 3, 4 emits in the acquisition field 11 of the imager 2 a light of at least one non-visible wavelength (step S2), for example in the infrared or ultraviolet, or both. This light is emitted in the direction opposite to that of the user 10, towards the document 6.

The emission of light in a non-visible wavelength by the light source 3, 4 may be conditioned by a condition relating to the document 6, as detailed subsequently, or else by a command from the user, for example the pressing of a button, or else further by a position of the head of the user 10 on which is positioned the device 1, for example when he/she has lowered his/her head. In the latter case, the measurements of the accelerometer and/or the gyroscope are the ones which are taken into account for preventing the illumination in a non-visible wavelength by the light source 3, 4. By taking into account the position of the head of the user 10, it is possible to prevent emission of light, notably in the ultraviolet, towards the owner of the document 6.

The imager 2 acquires (step S3) at least one image of the document 6 illuminated by the light source 3, 4 and sends the image to the processing computer 5, which may be dedicated to the device 1, or else those shared with smart glasses. It should be noted that the imager 2 may acquire images periodically, by filming, but that the light in a non-visible wavelength is only emitted from time to time. The authentication processing then only deals with the image(s) acquired during or immediately after this illumination.

If there are two light sources 3, 4, they may emit at the same time light of at least one non-visible wavelength, or else a first light source 3 may emit light of at least one non-visible wavelength, the imager 2 acquiring a first image of the document 6 illuminated by this first light source 3, and then a second light source 4 may emit light of at least one non-visible wavelength, different from that of the first light source 3, and the imager 2 acquires a second image of the document 6 illuminated by this second light source 4. These images are then sent to the processing computer 5.

FIG. 5 illustrates an example of differences in the visible elements of a document according to different wavelengths of light. In this case this is a driver licence from the State of New York. The first image 50 shows this licence in visible light. This first image is therefore representative of what a user 10 sees upon considering this document in normal light.

The second image 51 shows this same licence under infrared light. A security thread 52 then appears, while certain printed patterns have disappeared. These may be patterns made in metameric colors, which are pairs of chemically distinct colors which may be hardly distinguished under a determined type of illumination, generally in normal light, such as in daylight, but which form a well visible color contrast when they are observed under another type of light, often in the infrared. A particular metameric effect example is invisibility in the infrared, where visible ink ceases to be visible in a given portion of the infrared spectrum.

The third image 55 shows the security elements sensitive to ultraviolet radiations of the driver licence. A security element sensitive to ultraviolet radiations is a pattern printed by fluorescent ink, which may be visible in normal light and react to ultraviolet radiations. The fluorescence reaction is a light emission of very short duration, which almost immediately stops shining—within $10^{-8}$ seconds—after extinction of the light source. The security element sensitive to ultraviolet radiations may also be a pattern printed by fluorescent overprinting, invisible in normal light.

The security thread 52 is again found, which may be a thin strip consisting of plastic, of metal or of another material, integrated or partly integrated to the support during the process for manufacturing the paper support.

Security elements each forming an authentication pattern 53 sensitive to ultraviolet radiations, for example printed by fluorescent overprinting, also appear.

Thus, the illumination by a light of at least one wavelength outside the visible spectrum of a document 6 may demonstrate the presence of at least one security element, its absence, or else its alteration.

Therefore, once the image is acquired and sent to the processing computer 5, the processing computer on the image proceeds with detecting a security element (step S4) in a zone of the image in at least one wavelength outside the visible spectrum, for example in the ultraviolet or in the infrared. The document is then authenticated or not on the basis of the detection or not of the security element (step S6).

The step S4 for detecting a security element comprises the following sub-steps:
    extracting a zone of the image which may contain a security element (step S41),
    identifying in a database, a reference element corresponding to said security element and comparing the zone of the image with the reference element (step S42).

In order to identify the zone of the image to be extracted, the security element which may be contained therein, and the reference element, the type of the document must be known. Indeed, each secured document, such as a passport or a driver licence, includes security elements which are specific to it, both in their patterns, their features, for example their response to UVs, and in their locations.

In this respect, although it is possible that the user manually grasps the type of the document, this solution is not optimum. Thus, preferably, the method resorts to the reading of the machine readable zone MRZ 13 of the document 6.

An machine readable zone 13 is therefore detected (step S8), either on the image acquired during the illumination by the light source 3, 4 emitting light of at least one non-visible wavelength, or on an image acquired beforehand (step S7). Moreover it is possible that the detection of this machine readable zone 13 in an image of the document 6 acquired beforehand may be used for triggering light emission by the light source 3, 4 emitting the light in a non-visible domain (step S2). Thus, the emission of light in a non-visible wavelength by the light source 3, 4 may be conditioned by the detection of an machine readable zone 13 or by the information which is contained therein.

During the detection of an machine readable zone 13, the information contained in said machine readable zone 13 is extracted, and then processed by the processing computer 5. Indeed, the processing computer 5 is configured for extracting data relating to the document 6 having a predetermined configuration in the document 6, notably in the case when the data having a predetermined configuration, appear in alphanumerical form in the document.

Thus, the information contained in said machine readable zone 13 may be used for determining the type of presented document, and therefore for allowing identification of the zone of the image to be extracted, the security element which may be contained therein, and the reference element in a database.

The information contained in said machine readable zone 13 may also comprise data on the owner of the document 6, such as for example the name of the owner, and/or his/her date of birth, which may be immediately available by computer for filling in electronic files such as forms. Moreover, the information contained in the machine readable zone 13 may be used for recovering data (step S10) in a database, said data depending on the information contained in the machine readable zone 13. These data may then be displayed in the field of vision 12 of the user 10 by the head-up display means 9 (step S11).

For example, this may be a photograph relating to the owner of the document, which allows the user 10 to directly compare the photograph of the owner with the possessor of the document by juxtaposing them in his/her field of view 12. It should be noted that the displayed photograph may also be the photograph 15 present in document 6. This may further be other data, such as for example wanted notices or particular notifications.

The device 1 for authentication of information may also be used for acquiring by means of the imager 2, a photograph of the possessor of the document 6, more specifically of his/her face, in order to proceed with face recognition (also called facial recognition) by comparing one or several references. For example, these references may be formed by other photographs from a database in which they are associated with the identity of the owner of document 6, or else from a model or list of biometric markers. Recognition of the face is preferably applied by processing means 5. This application of face recognition gives the possibility of making sure that the possessor of the document 6 is actually the entitled owner of it, in spite of possible physical changes, for example due to age or to changes in pilosity or haircut.

The acquisition and the processing of the image of the document 6 however does not give the possibility of utilizing the optional presence of a chip, i.e. of a secured electronic support consisting of an integrated circuit intended to store and process data, for example integrated in passports, identity cards and biometric residence permits. The chip may for example contain private data: the name, the location and date of birth, the issuing authority and the scan of the face of the owner. The chip may be a contact chip or a contactless chip.

In the case of a contact chip, in order to be able to read the information which appears in an identity card provided with a contact chip, the chip must be able to come into contact with electric connectors. A contactless chip is a contactless integrated circuit. The chip (invisible on most documents) is connected to an antenna giving the possibility of communicating with the card reader by means of electromagnetic waves. The reader should be sufficiently close so that transmission may begin. The protected contents of the chip may be read from a distance from 0 to 10 cm.

Biometric passports or electronic passports include a contactless (or proximity) chip. This chip may be integrated into the travel document in different ways. It may be integrated into a transparent thick security film, in the cover of the document, or in a special page in polycarbonate. In order to ensure security of the data, a basic access control (BAC) is often used: the contactless chip can only be read by the suitable reader after having been unlocked by means of a validated PIN code. It is also possible to use an extended access control (EAC) for authentication of the terminal. As a security, a digital signature, for example using the cryptographic protocol of the <<public key infrastructure>> (PKI) type protects the authenticity and integrity of the stored data.

Thus, the device for authentication of information may also comprise a chip reader support adapted so as to be mounted on the hand of a user. This support may for example assume the shape of a glove or a ring provided with a chip reader. The chip reader may be a contact chip reader or preferably a contactless chip reader.

In FIG. 3, is shown an example of a chip reader support 30 mounted on one hand of the user 10. The support 30 may comprise a mounting 31 assuming here the shape of a ring, a radiofrequency antenna of the NFC (<<Near Field Communication>>) type, a chip reader 32, and a wired or wireless communication interface, and an electric power supply. Preferably, the electric power supply is made with a battery. The communication interface is preferably a radio-communications interface of the Bluetooth type. The support may comprise a micro-controller. The micro-controller and the battery may be remotely transferred into a casing 33 for example mounted on the wrist of the user. A wire 34 connects this casing 33 to the mounting 31, in order forward information between the chip reader 32 and the micro-controller of the casing 33, as well as for supplying power to said chip reader 32 from the battery of the casing 33.

The chip reader support 30 is connected to the processing computer 5 to which are sent the images acquired by the imager 2, and this processing computer 5 is also configured for processing the information from the reading of the chip. The connection between the chip reader support 30 and the processing computer 5 may be wired but preferably it is a radiofrequency link produced by an interface of the Bluetooth type.

As illustrated in FIG. 3, upon presentation to the user 10 of a document 6 provided with a chip 16, the user 10 places the chip reader 32 support 31 in proximity to the chip 16 of the document 6. For example, if the reader 32 is placed at a finger of the user, said user places his/her finger in proximity to the chip 16. The mounting 31 which bears the reader 32 is preferably placed at the hand which is intended to come near the chip 16 when the user holds the document 6 in his/her hand. Preferably, the reader 32 is placed at the forefinger or the thumb of the hand of the user.

Thus, natural grasping of the document 6 with the hand of the user 10 brings the reader 32 in proximity to the chip 16, so that a radiofrequency communication is established between the reader 32 and the chip 16. Access to information of the chip 16 may however be restricted by a key or a code.

For example, the PACE, acronym for <<Password Authenticated Connection Establishment>>, protocol for establishing an authenticated connection via a password, uses the data of the machine readable zone for authentication. An additional optional datum—the code for accessing the card—which is printed in the visual inspection zone of the page of the biographic data—may also be used for authentication.

The extraction of information from the machine readable zone (step S9) or else reading of the data by optical character recognition, may give information to the key required for reading the chip 16. From images acquired by the imager 2, the processing computer 5 may decode the information which are contained therein and calculate the key giving the possibility of reading the chip 16. The processing computer 5 sends this key to the chip reader 32. The latter reads the chip 16 and the read information is sent, for example via the wired connection 34 and the radiofrequency interface of the support 30 towards the processing computer 5.

For example, the information read in the chip 16 may comprise photographs of the face of the possessor of the document 6 and/or fingerprints, or any other data such as biometric data. The processing computer may then compare the pieces of information read in the chip 16 with those extracted from the machine readable zone or those extracted from other portions of the document 6 such as the photograph. A display of pieces of information by means of the head-up display means 9 may be carried out, with for example the display of the result of the aforementioned comparison or else the juxtaposition of data such as photographs.

The invention is not limited to the described embodiment and illustrated in the appended Figures. Modifications remain possible, notably from the point of view of the formation of the diverse elements or by substitution of technical equivalents, without however departing from the field of protection of the invention.

The invention claimed is:

1. A method for authenticating a secured document for which authentication is requested, wherein the method is performed with a device for authentication of information contained in a secured document, said device including at least one imager configured for acquiring at least one image of an acquisition field, at least one light source,
the device being adapted so as to be mounted on the head of a user so that its acquisition field covers at least one portion of the field of vision of the user, the light source being configured so as to emit in the acquisition field of the imager a light of at least one non-visible wavelength, the imager being adapted for allowing acquisitions at said non-visible wavelength and thus allow acquisition at this non-visible wavelength of an image of the secured document Presented to the user in the acquisition field of the imager, the method comprising the steps according to which:
  the secured document to be authenticated is Presented to the user in the acquisition field of the imager;
  acquisition by the imager of an image of the secured document in the acquisition field,
  detection of a visible machine-readable zone of the secured document image of the secured document acquired by the imager and extraction of the information contained in said visible machine readable zone;
  the light source emits light in a non-visible spectrum containing said at least one non-visible wavelength into the acquisition field towards the secured document Presented to the user in the acquisition field, said security element sensitive to said non-visible wavelength;
  the imager acquires at least one image of the secured document illuminated by the light source in said non-visible wavelength and sends the image to a processing computer configured for processing the image and for extracting data relating to the secured document having a predetermined configuration in the secured document,
  the processing computer performs on the image of the secured document illuminated by the light source in said non-visible wavelength a detection of the security element in said at least one non-visible wavelength out of the visible spectrum,
  the secured document is authenticated or not on the basis of the detection or not of the security element in said non-visible wavelength.

2. The method according to claim 1, wherein the step for detecting a security element comprises the following sub-steps, from information contained in the machine-readable zone:
  extracting a zone of the image which may contain a security element,
  identifying in a database a reference element corresponding to said security element and comparing the zone of the image with the reference element.

3. The method according to claim 1, comprising steps according to which:
  the data are retrieved in a database depending on information contained in the machine-readable zone, and these data are displayed in the field of vision of the user by head-up display means.

4. The method according to claim 1, wherein the emission of light in a non-visible wavelength by the light source is conditioned by the reading of the machine-readable zone.

5. The method according to claim 1, wherein the light emission in a non-visible wavelength by the light source is conditioned by a command from the user.

6. A computer-readable non-transitory medium comprising program code instructions recorded thereon which may be used in a computer for executing steps of the method according to any one of claims 1, 2, 3 and 5 when said program is executed on a computer.

7. The method of claim 1, wherein the light source is configured for emitting in the infrared domain or ultraviolet domain, and the non-visible wavelength is in the infrared domain or ultraviolet domain.

8. The method of claim 7, wherein the device comprises at least:
  a first light source configured for emitting light in the ultraviolet range in the field of acquisition of the imager,
  a second light source configured for emitting light in the infrared range in the field of acquisition of the imager; and
one of the first light source and the second light source emits light at a non-visible wavelength to illuminate the secured document, the imager acquiring a first image of the secured document illuminated by said light source, then the other one of the first light source and the second light source emits light at a non-visible wavelength to illuminate the secured document, the imager acquiring a second image of the secured document illuminated by said light source.

9. The method of claim 7, wherein the device comprises at least:
  a first light source configured for emitting light in the ultraviolet range in the field of acquisition of the imager,
  a second light source configured for emitting light in the infrared range in the field of acquisition of the imager; and
the first and second light sources emit light at the same time to illuminate the secured document.

10. The method according to claim 1, wherein the device further comprises a chip reader support adapted so as to be mounted on the hand of the user, and the method comprises:
  placing the chip reader support in proximity to a chip of the secured document;
  reading of information stored on the chip by the chip reader,
  sending the information read on the chip to the processing computer.

11. The method according to claim 10, wherein access to information of the chip of the secured document is restricted by a key or a code, and the information extracted from the machine-readable zone of the secured document are used by the processing computer to determine and send a key or code to the chip reader so that said chip reader access the information stored on the chip of the secured document.

12. An assembly for authentication of information contained in a secured document, said assembly including a processing computer and a device for authentication of information contained in a secured document for which authentication is requested, said device comprising
  at least one imager configured for acquiring at least one image of an acquisition field,
  at least one light source,
wherein said device is adapted so as to be mounted on the head of a user so that its acquisition field covers at least one portion of the field of vision of the user, the light source being configured so as to emit in the acquisition field of the imager a light of at least one non-visible wavelength, the imager being adapted for allowing acquisitions at said wavelength and thus allow acquisition at this non-visible wavelength of an image of a secured document Presented to the user in the acquisition field of the imager, and
wherein said assembly is configured for:
  the light source to emit light in a non-visible spectrum containing said at least one non-visible wavelength into the acquisition field towards the secured document presented to the user in the acquisition field, said security element sensitive to said non-visible wavelength, the imager to acquire at least one image of the secured document illuminated by the light source in said non-visible wavelength and to send the image to the processing computer, the processing computer configured to process the image and extracting data relating to the secured document having a predetermined configuration in the secured document, and to perform on the image of the secured document illuminated by the light source in said non-visible wavelength a detection of the security element in said at least one non-visible wavelength out of the visible spectrum, the document being authenticated or not on the basis of the detection or not of the security element.

13. The device according to claim 12, wherein the data having a predetermined configuration appear in alphanumerical form in the secured document.

14. The device according to claim 13, wherein the light source is configured for emitting in the infrared or ultraviolet domain.

15. The device according to claim 14, comprising at least:

a first light source configured for emitting light in the ultraviolet range in the field of acquisition of the imager;

a second light source configured for emitting light in the infrared range in the field of acquisition of the imager.

16. The device according to claim 12, wherein the device comprises a frame adapted for maintaining the device on the head of the user by cooperating with said head.

17. The device according to claim 12, wherein the device comprises mounting means for mounting the device on a spectacle frame.

18. The device according to claim 12, further comprising head-up display means intended to be positioned in the field of vision of the user.

19. The device according to claim 12, comprising an accelerometer and/or a gyroscope, the measurements of which are taken into account for controlling the imager and/or the light source.

20. The device according to claim 12, further comprising a chip reader support adapted so as to be mounted on the hand of the user.

* * * * *